Oct. 14, 1969  G. B. JOHNSON  3,471,912
TOOL HOLDER ASSEMBLY FOR MACHINE TOOLS
Filed Feb. 6, 1967
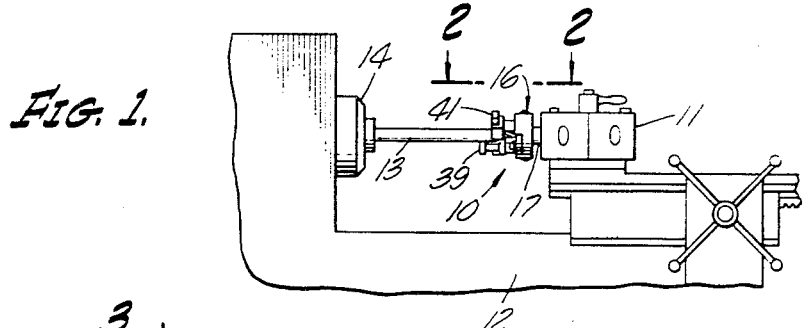
FIG. 1.
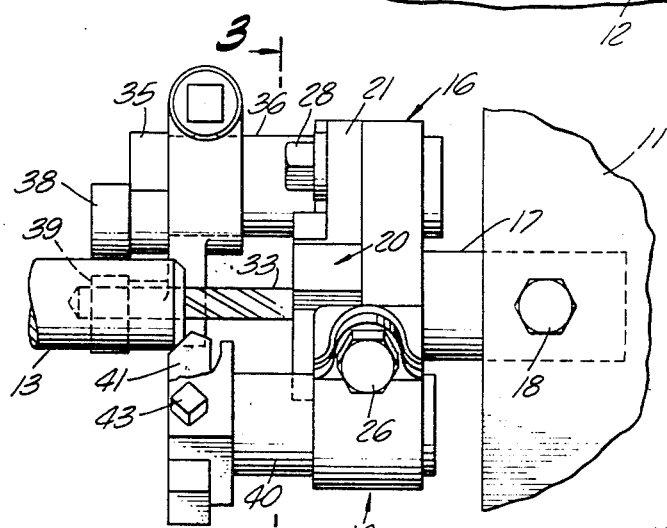
FIG. 2.
FIG. 3.
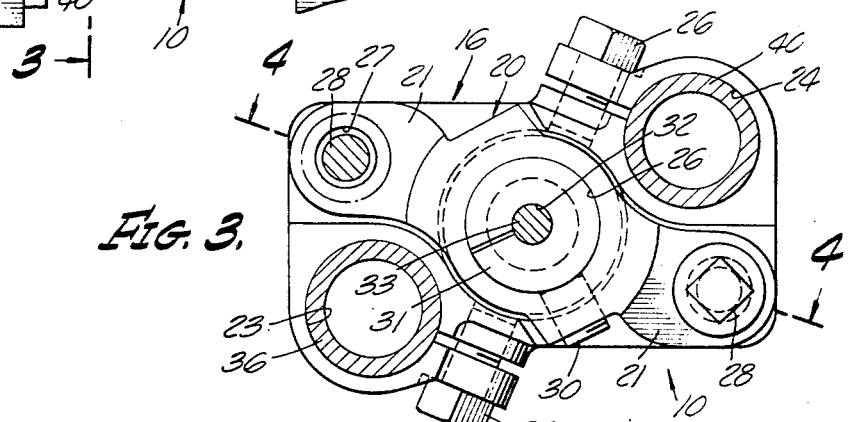
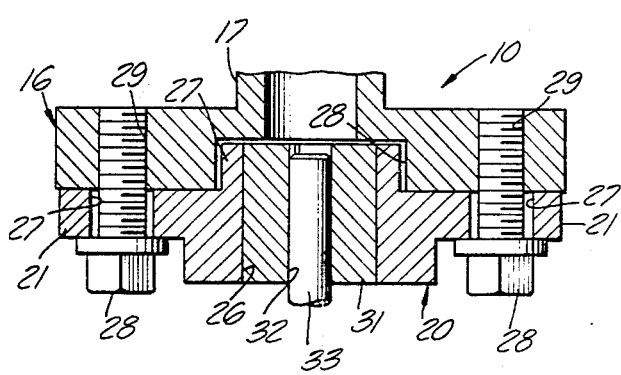
FIG. 4.
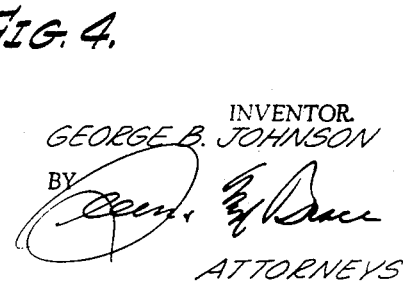
INVENTOR.
GEORGE B. JOHNSON
BY
ATTORNEYS United States Patent Office 3,471,912
Patented Oct. 14, 1969

3,471,912
TOOL HOLDER ASSEMBLY FOR MACHINE TOOLS
George B. Johnson, 1537 Blake St.,
Los Angeles, Calif. 90039
Filed Feb. 6, 1967, Ser. No. 614,300
Int. Cl. B23b 25/06, 31/04, 29/00
U.S. Cl. 29—57                                                6 Claims

ABSTRACT OF THE DISCLOSURE

A tool holder assembly having a T-shaped main body with means for clamping a pair of different cutting tools thereto with provision for attaching, detaching and adjusting each of the cutting tools without adversely affecting the position or adjustment of the other.

---

This invention relates to tool holders and more particularly to an improved rugged assembly adapted to be mounted on a turret head or a slide carriage for supporting one or a plurality of tools and other accessories useful in performing a machining operation on a rotated workpiece. The assembly is characterized by a T-shaped main body having a mounting shank clampable in a support carried by the machine tool and having a pair of clamping sockets facing oppositely from the shank at the diagonally disposed corners of the T-head. A third mounting support has a tool socket coaxially of the head end of the mounting shank and a pair of adjustable anchor tangs overlying the other pair of diagonally related corners of the T-head. This fitting has limited planar movement in any direction crosswise of the T-head and can be serviced and clamped without disturbing accessories mounted in either mounting socket. Likewise, either of the latter sockets can be serviced without disturbing a tool mounted in the center fitting.

Tool mounting accessories as heretofore provided for use in supporting a plurality of accessories are characterized by their lack of rigidity and ruggedness and more particularly by the fact that the supporting shank for anchoring the assembly to the machine tool has been so designed that it is impossible to shift the position of one tool support socket relative to the accessory shank without upsetting the operating positions of the other accessories relative to the workpiece. This is because the components provided for supporting the accessories include provision for adjustably connecting them to the assembly mounting shank. It necessarily follows that any change in the position of the tool support relative to the shank necessarily upsets the positions of all tools relative to the workpiece axis.

Another serious shortcoming of prior designs has been the fact that the entire main support for the cutting tool is supported outboard from the outer end of the T-head member secured to the machine tool. In consequence, the cutting tools are mounted at a substantial distance from the outer end of the supporting shank with the result that the tools are not as rigidly supported as is desirable and possible with the modified tool holder assembly provided by the present invention. Additionally, the loss of one of the two assembly bolts holding the main body of the tool to the T-head in the prior art design now in general use permits the tool to rotate 180° about the other assembly bolt. This can result in serious damage to the tool, the machine tool or to the workpiece, a consequence not possible with the present invention tool holder assembly for reasons which will become evident from the detailed description set forth below.

It is therefore a primary object of the present invention to avoid the foregoing and other shortcomings of prior tool mounting assemblies.

Another object of the invention is to provide a simpler and more rugged multiple holder for use with machine tools and having a plurality of mounting sockets for supporting cutting tools and other accessories for conjoint use with a workpiece undergoing machining.

Another object of the invention is the provision of a simple versatile tool holder so designed that any one of three cutting tools or other accessories can be adjusted and serviced at any time without upsetting the working relationship of the other tools and accessories relative to the workpiece.

These and other more specific objects will appear upon reading the following specification and claims and upon considering in connection therewith the attached drawings to which they relate.

Referring now to the drawings in which a preferred embodiment of the invention is illustrated.

FIGURE 1 is a fragmentary elevational view showing the tool mounting assembly of the present invention in use on a turret lathe;

FIGURE 2 is a fragmentary top plan view on an enlarged scale taken along line 2—2 on FIGURE 1;

FIGURE 3 is a cross-sectional view taken along line 3—3 on FIGURE 3; and

FIGURE 4 is a cross-sectional view taken along line 4—4 on FIGURE 3.

Referring more particularly initially to FIGURE 1, there is shown a preferred embodiment of the invention tool holder assembly designated generally 10. The assembly is thereshown rigidly clamped to a turret head 11 mounted in a conventional machine lathe 12 and positioned to perform multiple cutting operations upon a workpiece 13 clamped within chuck 14.

Referring to FIGURES 2, 3 and 4, it will be understood that the holder assembly proper has a T-shaped main body including a T-head 16 and a cylindrical mounting shank 17 adapted to fit snugly in an opening of turret 11 where it is rigidly clamped by set screw 18. The other principal component of the tool holder assembly is an elongated tool holding fitting 20 provided with a pair of anchor tangs 21 projecting in opposite directions from its central portion. Fitting 20 will be described more fully presently.

As is best shown in FIGURE 3, T-head 16 is generally rectangular as viewed from its outer face and its diagonally spaced end corners are formed with integral split ring sockets 23, 24 each provided with its own clamping cap screw 25, 26. The openings of each sockets extend entirely through T-head 16 and are sized to fit standard diameter mounting shanks for tool holders, back-up rollers and the like accessories intended for use with the invention assembly. The axes of sockets 23, 24 are parallel to one another and to the axis of mounting shank 17 and are spaced equidistantly from the shank axis.

Tool mounting fitting 20 is illustrated in FIGURES 3 and 4 and includes a central tool receiving opening 26 extending clear through the fitting and has a boss 27 on its inner face the circumference of which fits loosely within a well 28 coaxially of shank 17.

The rim of fitting 20 is appropriately contoured in the manner best shown in FIGURE 3 to have limited freedom of movement in all planar directions crosswise of the outer face of the T-head. Anchor tangs 21, 21 project diametrically from the opposite sides of the central opening 26 and the outer end of each is provided with an opening 27 substantially larger in diameter than the shank of the clamping cap screws 28, 28. The threaded ends of the latter mate with threaded openings 29 in one set of diagonally located corners of T-head 16. Central opening 26 of fitting 20 includes a set screw 30 (FIGURE 3) which can be used to lock the shank of a drill or other cutting tool in opening 26 or, more conventionally, to contract a split bushing 31 having a snug fit within opening 26 and provided with a central opening 32 of an appropriate size to grip the shank of a drill or other cutting tool 33.

One of the many typical modes of using holder assembly 10 is illustrated in the accompanying drawing wherein a conventional back-up roller accessory 35 having a mounting shank 36 is shown clamped in socket 23 by cap screw 25. Such back-up accessories are well known to workers skilled in this field and usually include a pair of rollers 38, 39 providing cradling support for the sides of a workpiece 15 in the manner illustrated in FIGURE 2.

Rigidly clamped in the other tool mounting socket 24 is a shank 40 supporting a cutting tool 41 with its cutting edge disposed to chamfer the right-hand end of workpiece 13 as the latter rotates. The third member clamped to assembly 10 comprises a drill 33 having its shank gripped by bushing 31 carried by fitting 20. The cutting tip of this drill is shown in FIGURE 2 as extending axially into workpiece 15.

The mode of use of tool holding assembly 10 will be evident from the foregoing detailed description of its components and their operating relationship to one another. Should it be desirable to service or replace cutting tool 41 with another at any time, this is easily accomplished by loosening set screw 43 and removing or readjusting cutter 41. This operation does not upset or interfere in any way with the adjusted position of any other component of the assembly. This is equally true should it be necessary to replace the entire cutter holder 40, 41 with another requiring a different holder. This is accomplished by loosening clamping screw 26 and substituting and adjusting the substitute holder. The remaining clamping screws 25, 28, 28, all remain snugly in place and the only operation required is the substitution of the new tool and the proper adjustment of its cutting edge relative to the workpiece.

Let it be assumed that the drill 33 breaks or that it is desirable to replace this drill with a different one of a different size. It is a simple matter to loosen and remove fitting 20 by detaching clamping screw 28, 28. The released bushing may now be removed and one of different size along with a new drill can be inserted after which fitting 20 is reassembled and checked for adjustment before tightening clamping screws 28, 28. Fitting 20 can be shifted in any planar direction until the precise desired adjustment is obtained all without need for interfering with or changing the adjustment of the back-up rollers or cutting tool 41. It will also be recognized that by detaching fitting 20 supporting a drill or the like tool, the cutting capacity of a tool or tools clamped in fittings supported in sockets 23, 24 can be increased by at least twenty-five percent. This fact will be evident from a considerable of FIGURE 4 from which it will be appreciated that the absence of fitting 20 from main body 16 permits the free end of the workpiece to be advanced to the bottom of well 28.

While the particular tool holder assembly for machine tools herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A tool holder assembly for use in rigidly supporting a plurality of cutting tools and accessories on a machine tool for concurrent use on the same workpiece, said assembly having a generally T-shaped main body provided with a centrally disposed cylindrical mounting shank projecting from one face of the T-head thereof, means adjustably and rigidly supporting separate and independent cutting tool accessories on the outer ends of the other face of said T-head and spaced diametrically to either side of the axis of said cylindrical mounting shank, an elongated tool support fitting having a centrally disposed tool clamping means and its opposite ends extending across said other face of said T-head and between said cutting tool accessories, the opposite ends of said fitting having enlarged openings loosely fitting about the smaller shanks of a pair of clamping cap screws threaded into the outer ends of said T-head and limited freedom of movement in the plane of said other T-head surface when said cap screws are loosened, and each of said cutting tool accessories and said elongated fitting being adjustable independently of and without disturbing the position of any other one thereof while the mounting shank of said tool holder assembly remains rigidly clamped to a machine tool.

2. A tool holder assembly as defined in claim 1 characterized in that said elongated fitting has a boss projecting from one face into a larger similarly-shaped well in said T-head on the face thereof opposite said mounting shank.

3. A tool holder assembly as defined in claim 1 characterized in that said tool mounting means of said elongated fitting includes a split ring bushing adapted to clamp a cutting tool therewithin when said bushing is contracted, and means on said elongated fitting for contracting a split bushing seated therein.

4. A tool holder assembly as defined in claim 1 characterized in that said elongated fitting is provided with means for clamping a cutting tool in said centrally disposed opening, and said elongated fitting having limited freedom of movement relative to said cutting tool accessories.

5. A tool holder assembly as defined in claim 1 characterized in that said cutting tool accessories project outwardly from one pair of diagonally disposed end corners of said T-head and in that the opposite ends of said elongated fitting extend to and overlie the other pair of diagonally disposed end corners of said T-head.

6. A tool holder assembly as defined in claim 1 characterized in that said cap screws are accessible for adjustment from the face of said T-head on the opposite side thereof from said mounting shank.

References Cited

UNITED STATES PATENTS

| 2,047,222 | 7/1936 | Poorman | 82—35 |
| 2,625,402 | 1/1953 | Dick | 279—16 |
| 3,359,008 | 12/1967 | Stimmerman | 77—60 XR |

FOREIGN PATENTS

| 703,058 | 1/1954 | Great Britain. |

LEONIDAS VLACHOS, Primary Examiner

U.S. Cl. X.R.

77—60; 82—35